Aug. 21, 1962 L. D. HARMON 3,050,713

OUTPUT SELECTING CIRCUIT

Filed Dec. 16, 1959 2 Sheets-Sheet 1

INVENTOR
L. D. HARMON
BY
A. E. Hirsch, Jr.
ATTORNEY

INVENTOR
L. D. HARMON
BY
A. E. Hirsch Jr.
ATTORNEY

United States Patent Office 3,050,713

Patented Aug. 21, 1962

3,050,713

OUTPUT SELECTING CIRCUIT

Leon D. Harmon, Warren Township, Somerset County, N.J., assignor to Bell Telephone Laboratories, Incorporated, New York, N.Y., a corporation of New York Filed Dec. 16, 1959, Ser. No. 859,896
6 Claims. (Cl. 340—172)

This invention relates to classifying circuits and, more specifically, to circuits for selecting a particular output device from among a plurality of such devices in order to represent the amplitude of a given input signal.

In many areas of electrical applications, signal amplitude classification is necessary. For instance, a signal of given amplitude may represent, in electrical analog form, some particular function or quantity. In order to classify the signal it is often necessary to trigger one of a plurality of output devices. To accomplish this, an amplitude classifying system is employed, which preferably should meet the following requirements. First, each one of a plurality of output devices should represent a unique signal amplitude or amplitude range. Second, a signal to be amplitude classified, although applied to all of the output devices, should trigger only that one representative of the particular signal amplitude. Third, the system should accurately classify applied signals within a wide range of possible amplitudes, while at the same time distinguishing between small increments of signal amplitude within this range.

These requirements are satisfied in the present invention by applying a signal that is to be amplitude classified to the trigger input circuits of a group of disabled bistable devices each having a different triggering threshold. Only those devices having triggering thresholds less than or equal to the amplitude of the input signal are thus capable of being triggered to conduction. The bistable devices are then enabled in time sequence in the order of decreasing thresholds. Consequently, the device that has the highest allowable triggering threshold will first be triggered. To prevent the subsequent triggering of the remaining devices as they become enabled, the input signal is removed whenever triggering occurs in one of the bistable devices. Thus, when the remaining devices, having lower triggering thresholds, are thereafter enabled they cannot be triggered to conduction since no input signal remains on their input circuits. As a result, only one bistable device, i.e., that one which has a triggering threshold corresponding to the particular amplitude of the input signal, is triggered to conduction. Alternatively, the remaining devices may be prevented from firing by suitably inhibiting or disabling them rather than by removing their input signal.

The invention may be more readily understood by reference to the following detailed description of preferred embodiments of the invention taken in conjunction with the appended drawings, in which.

Figure 1:
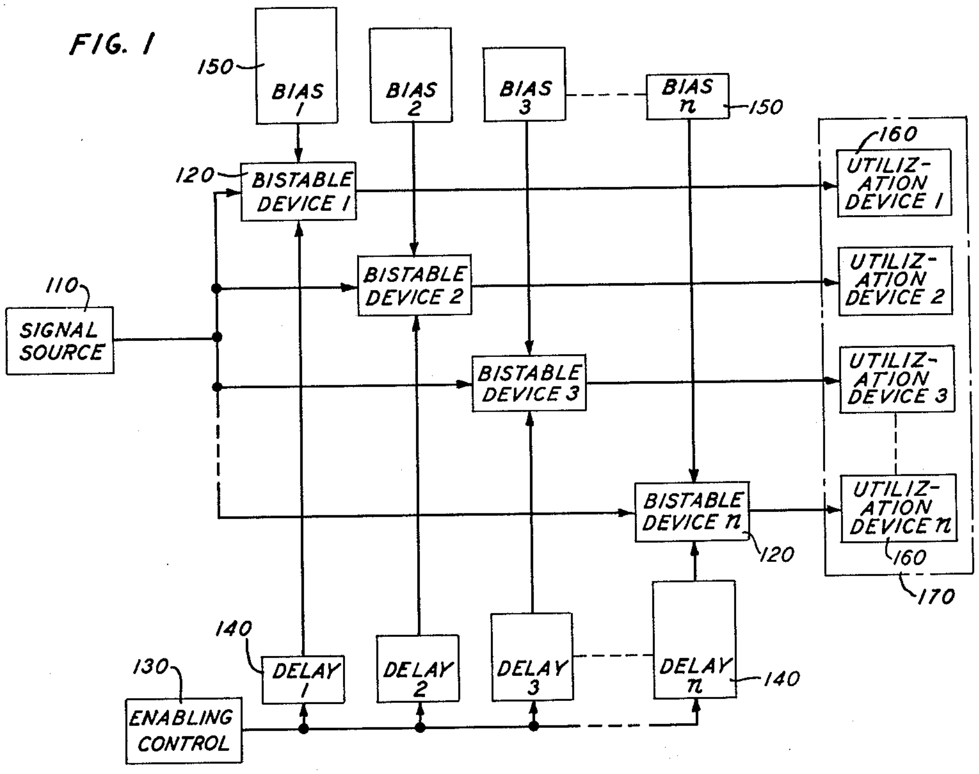
FIG. 1 is a schematic block diagram of one embodiment of the invention.

Referring to FIG. 1, a signal whose amplitude is to be classified, which, for example, may be represented by the charge stored on a capacitor, is applied from the signal source 110 to the trigger inputs of all of a plurality of non-conducting bistable devices 120. Until signal classification is desired, all of the bistable devices are disabled, i.e., they are prevented from being triggered to conduction regardless of the magnitude of the signal applied to the trigger inputs. The bistable devices are biased separately, each with a different value of bias, by bias sources 150. Each bias source acts upon its associated bistable device to establish a triggering threshold, so that the device cannot potentially be triggered to conduction unless the amplitude of the signal upon the trigger input of the device exceeds this threshold.

When it is desired to classify the amplitude of the signal supplied from source 110, enabling control 130 is actuated. Control 130 comprises, for example, a potential source with suitable switching means to apply an enabling potential to all of the delays 140. Because of the delays 140 inserted between each bistable device and the enabling control, the bistable devices are not immediately enabled. The magnitudes of the delays 140 are so proportioned that each delay interval bears an inverse relation to the magnitude of the triggering threshold of the associated bistable device. In other words, bistable device 120–1, which has the greatest applied bias, and, accordingly, the highest triggering threshold, is enabled first. Bistable device 120–2, which has the next greatest applied bias, and accordingly, the next highest triggering threshold, is enabled second. Thus, the bistable devices are enabled in time sequence in the order of decreasing triggering thresholds.

The device first triggered to conduction is that one first enabled which has a triggering threshold equal to or less than the amplitude of the input signal. In accordance with the invention, the signal from source 110 is coupled within each of the bistable devices to the trigger input of that device in a fashion such that the signal is removed when the device is triggered to conduction. Thus, when one of the devices has been triggered to conduction, the remaining devices having lower triggering thresholds cannot be triggered when they become enabled, since the input signal has been removed and is no longer "presented" to the trigger inputs. Accordingly, only that one bistable device is triggered that meets two independent requirements: it has a triggering threshold less than or equal to the amplitude of the input signal, and its threshold is more nearly equal to the input signal amplitude than that of any other device having a lower threshold.

The outputs of the bistable devices may be conveniently connected, respectively, to appropriate utilization devices 160, which may be of any type well known in the art. These devices may be placed at any remote location, and, accordingly, are shown positioned within the dashed enclosure 170.

Figure 2:
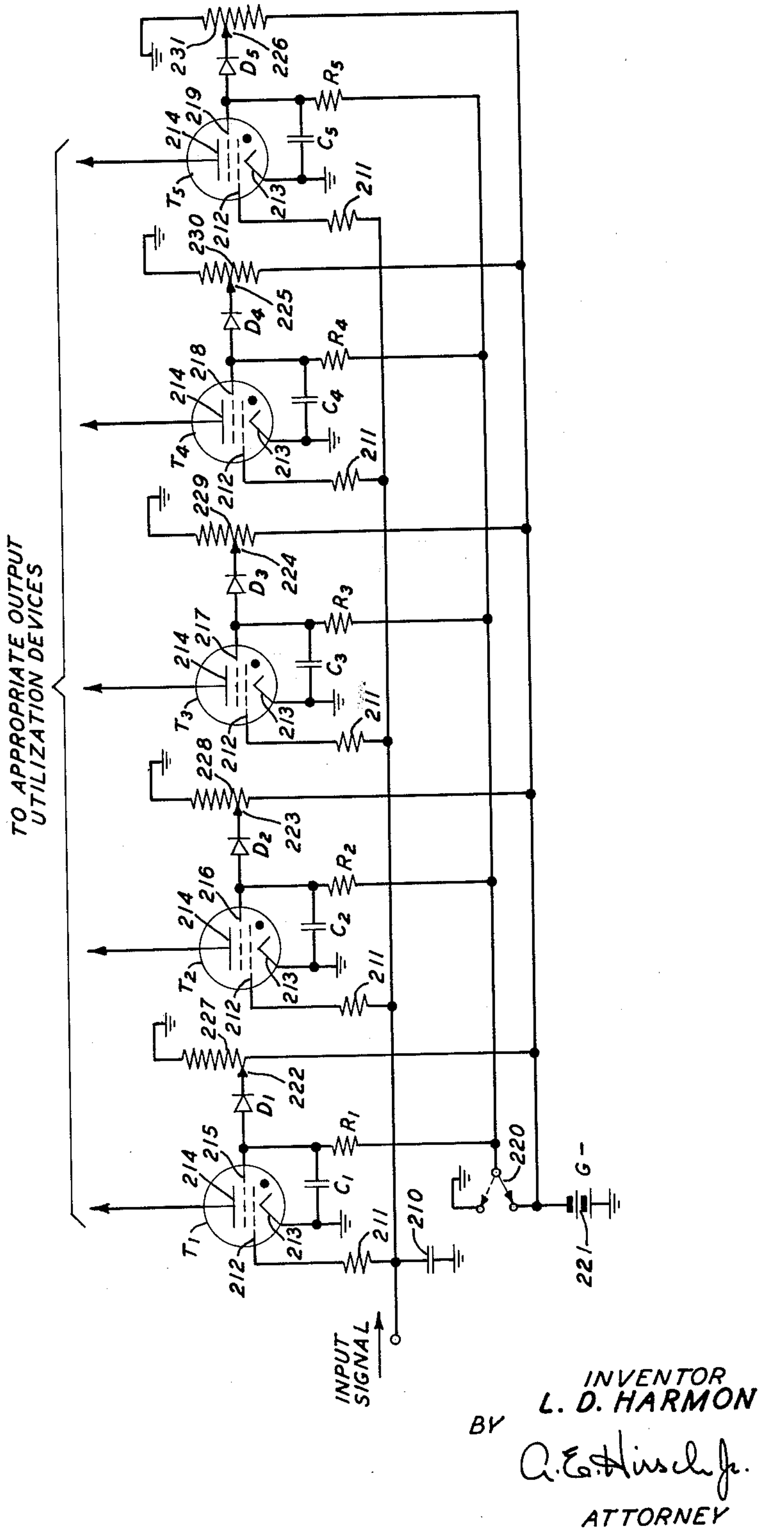
FIG. 2 is a schematic circuit diagram of an embodiment of the invention utilizing a series of thyratrons as elements thereof.

FIG. 2 is a schematic diagram of an embodiment of this invention utilizing a series of thyratrons, resistor-capacitor networks, and unidirectional current-passing devices, such as, for example, diodes. In the embodiment depicted, the circuit classifies the amplitude of an input signal into one of five categories. The signal to be classified is applied to and stored on a capacitor 210 that is connected through resistors 211 to the control grids 212 of all of the thyratrons $T_1$, $T_2$, $T_3$, $T_4$ and $T_5$, the latter serving as the bistable devices. The cathodes 213 of all the thyratrons are connected to ground, while the anodes 214 are connected, respectively, to appropriate output utilization devices (not shown), such as the devices 160 depicted in FIG. 1. The anodes 214 may be biased positively by any source of positive potential within the output utilization devices. The screen grids 215, 216, 217, 218 and 219 are connected to diodes $D_1$, $D_2$, $D_3$, $D_4$ and $D_5$, respectively. The diode elements D are also connected, respectively, to the adjustable taps 222, 223, 224, 225 and 226 of potentiometers 227, 228, 229, 230 and 231 that, in turn, are connected between a source 221 of negative potential G— and a more positive reference potential, e.g., ground. The adjustable taps are positioned so that diode $D_1$ is biased the most negatively, diode $D_2$ is biased the secondmost negatively, and so on to diode $D_5$ which has the lowest negative bias. Resistors $R_1$, $R_2$, $R_3$, $R_4$ and $R_5$ are connected, respectively, between each screen grid and a switch 220, the latter being connected either to source 221 or to ground. The screen grids are shunted to ground by capacitors $C_1$, $C_2$, $C_3$, $C_4$ and $C_5$, respectively. The resistors R and the capacitors C are so chosen that the time constants of the R-C combinations increase progressively from $R_1C_1$ to $R_5C_5$.

In the interval during which the input signal is stored on capacitor 210 prior to classification, switch 220 is connected to the negative potential source 221 of G— volts. This potential is applied through resistors R to each of the thyratron screen grids to bias them to cutoff; hence, none may fire regardless of the magnitude of the input signal. The signal stored on capacitor 210 does not leak off appreciably during this storage period, since the control grids 212 of the unfired thyratrons present, effectively, infinite impedances. During the storage period each of the capacitors C is charged by potential source 221 to a potential of G— volts.

At any time $t_0$, when it is desired to classify the amplitude of the signal stored on capacitor 210, switch 220 is grounded. This, in effect, applies the enabling potential, e.g., ground, to the resistors R. Each of the capacitors C, charged to a potential of G— volts, then commences to discharge to ground through the associated resistor R. Accordingly, all the screen grid potentials swing from a potential of G— volts toward ground at a rate determined by the time constant of the associated RC network. Each capacitor C continues to discharge toward ground until its potential is equal to the bias potential of the associated diode. This effectively provides a delay between $t_0$ and the instant when each screen grid assumes its predetermined final potential. At this point the diode conducts. The resistance of each resistor R can be chosen sufficiently higher than that of the associated biasing potentiometer so that the diode's conduction results in clamping of the screen grid effectively at the preset bias value.

Figure 3A:
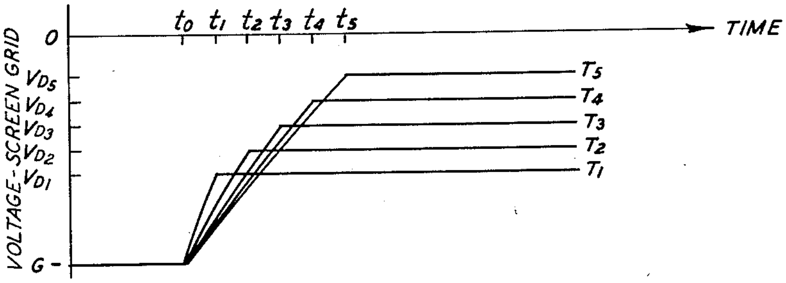
FIG. 3A is a series of curves in which screen grid voltage is plotted versus time for the thyratron elements of FIG. 2.

Referring to FIG. 3A, the voltage swing of each of the screen grids is illustrated by the curves labeled $T_1$ through $T_5$. Curve $T_1$ depicts the voltage swing of the screen grid of thyratron $T_1$; curve $T_2$ depicts the voltage swing of the screen grid of thyratron $T_2$; and similarly for curves $T_3$ through $T_5$. The biasing potentials of diodes $D_1$ to $D_5$ are represented as $V_{D_1}$ to $V_{D_5}$, respectively. Thus, the screen grid of thyratron $T_1$ swings from G— volts at time $t_0$ to $V_{D_1}$ volts at time $t_1$, at which time diode $D_1$ conducts and clamps the screen grid at this voltage. Similarly, the screen grids of thyratrons $T_2$ through $T_5$ swing from G— volts at time $t_0$ to voltages $V_{D_2}$ to $V_{D_5}$, at times $t_2$ to $t_5$, respectively, and are all clamped at the respective diode biasing voltages as the diodes conduct. Since the time constants of the resistor-capacitor networks are selected in inverse proportion to the bias potentials applied to the diode elements, the screen grids are brought to their operating potentials in the order of decreasing operating potentials. In effect the thyratrons are enabled for triggering in the order of decreasing triggering thresholds. By a proper selection of the values of resistance and capacitance, the time increments $t_1—t_0$, $t_2—t_1$, and so on to $t_5—t_4$, which represent, respectively, the time lapse between the enabling of successive thyratrons, may be made equal.

If the signal stored on capacitor 210 is sufficiently large to fire one of the thyratrons, that tube is triggered to conduction as it becomes enabled. The common input signal is effectively dissipated in the fired thyratron, since the control grid impedance of a fired thyratron is extremely low in contrast to the nearly infinite impedance of an unfired thyratron. Accordingly, those thyratrons thereafter becoming enabled do not fire, as they ordinarily would, because there is no signal remaining on the control grids 212. Since the thyratrons are enabled in the order of decreasing triggering threasholds, only that thyratron having the most negative allowable screen grid bias fires, thus indicating the magnitude of the charge stored on the capacitor 210.

In the embodiment depicted in FIG. 2, the capacitor $C_1$ may, if desired, be dispensed with. Since thyratron $T_1$ is the first thyratron to be enabled, there need be no delay between the instant when switch 220 is grounded and the time when diode $D_1$ conducts and clamps the screen grid 215 at its operating bias. Accordingly, capacitor $C_1$ may be removed from the circuit altogether. In this event, $R_1$ will be shunted to ground only by stray capacitances within the circuit and the interelectrode capacitances within the thyratron $T_1$.

Figure 3B:
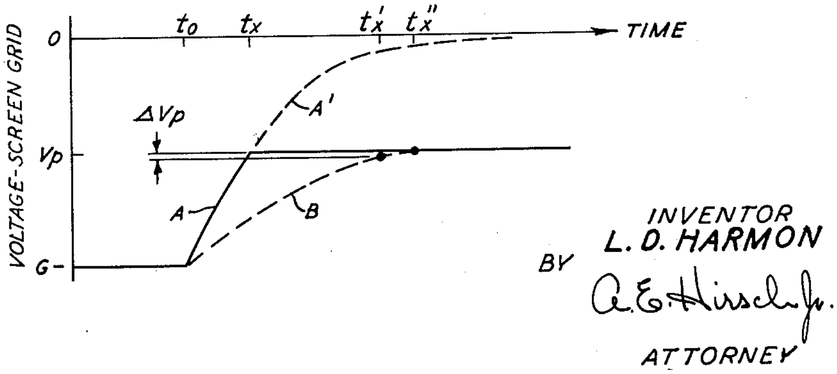
FIG. 3B is a set of curves describing more particularly the charging action of a typical capacitor element associated with the screen grid of one of the thyratrons of the apparatus of FIG. 2.

A better understanding of the action of the diode elements D of FIG. 2 may be achieved by consulting FIG. 3B. The solid curve labeled A, and its dashed extension A′, show how the screen grid voltage of one of the thyratrons swings from G— volts at time $t_0$, exponentially toward zero volts through the discharging action of the capacitor in the associated resistor-capacitor network. At time $t_x$ when the screen grid voltage equals the diode bias voltage $V_p$, the diode conducts and the screen grid is clamped at that voltage. The slope of the screen grid voltage curve is relatively steep at time $t_x$ and its intersection with the horizontal voltage curve $V_p$ is clearly defined. On the other hand, if the diode elements of FIG. 2 are not employed and the circuit is accordingly modified to bias the screens to the various fixed potentials under the control of switch 220, the potential of one of the screen grids would typically follow the curve labeled B. In this case, the associated capacitor C would discharge from voltage G— toward the potential $V_p$ instead of toward ground. The intersection of the curve B and the horizontal curve $V_p$ occurs at an uncertain time between $t_x'$ and $t_x''$. The uncertainty arises from possible random perturbations in supply voltages or thyratron firing characteristics, and is represented in the drawing as $\Delta V_p$. Thus, the thyratrons as a group might become enabled in a random order. By utilizing the diode elements, the slopes of the screen grid voltage curves are effectively increased, more clearly establishing their intersections with the desired bias level, which ensures correct enabling sequence.

Although the embodiment depicted in FIG. 2 classifies a signal amplitude into only one of five possible categories, it should be understood that any number $n$ of signal amplitude classification categories may be established within a given amplitude range by utilizing $n$ thyratrons, each having a screen grid bias different from any other. Furthermore, while thyratrons lend themselves particularly well to the embodiment described, their use is not essential. Any groups of bistable devices, each of which has a different triggering threshold, suffices. In the event that a fired bistable device is itself incapable of discharging the input signal, the output circuits of all the devices may be modified to dissipate the signal when one of the devices has fired.

Accordingly, this invention should not be deemed limited to the embodiments illustrated or described, since various modifications and other embodiments may readily be suggested to one skilled in the art.

What is claimed is:

1. Apparatus for triggering a selected one only of a plurality of bistable devices upon the application of an input signal to all of said devices comprising, a plurality of bistable devices each having a first and a second control circuit and an output circuit, said bistable devices being triggered from one state to another only upon the simultaneous application to said first and said second control circuits respectively of signals of predetermined magnitudes, a source of input signals, means for storing a signal from said source, means for applying said stored signal continuously to all of said second control circuits, a plurality of bias potential sources of different magnitudes, means for sequentially applying bias potential from said sources to different ones of said first control circuits whereby that one of said bistable devices is triggered to conduction for which the magnitude of the bias potential applied to its first control circuit first equals the magnitude of stored signal applied to its second control circuit, and means for dissipating said stored signal when one of said bistable devices is triggered, both to prevent subsequent triggering of any other of said bistable devices and to clear said storage means for a new signal from said source.

2. An amplitude classifying circuit comprising a plurality of bistable devices each having a first and a second control circuit and an output circuit, said bistable devices being triggered to conduction only upon the application to said first and second control circuits, respectively, of signals bearing a predetermined relationship to each other, a network comprising a resistor and a capacitor associated with each of said first control circuits, said capacitor being connected between its associated first control circuit and a first source of reference potential, said resistor being connected between said first control circuit and a point of common connection, each of said resistor-capacitor networks being proportioned to have a time constant different from that of any other resistor-capacitor network, means for applying to said point of common connection a second source of potential sufficient to bias all of said bistable devices to cutoff, means for coupling an input signal to all of said second control circuits, a plurality of potential sources of differing magnitudes each connected respectively to a different one of said first control circuits through a unidirectional current-passing device, means for removing said second potential source from said point of common connection and applying thereto said first source of reference potential, and means for removing said coupled input signal when one of said bistable devices is triggered to conduction.

3. In combination, a plurality of gaseous discharge devices each having a control grid and a screen grid, means for applying a cut-off bias potential to all of said screen grids to prevent triggering of said gaseous discharge devices upon the application of an applied signal to said control grids, means for applying an input signal whose amplitude varies over a given range to all the control grids of said discharge devices, means for reducing in time sequence the potentials of said screen grids from said cut-off potential to an operating potential, different for each, thus to permit triggering of said gaseous discharge devices in an order inversely proportional to the magnitudes of said operating potentials, means for removing said coupled input signal when one of said gaseous discharge devices is triggered to conduction by said input signal as said screen grid is brought from said cut-off potential to said operating potential.

4. A classifying circuit comprising a plurality of gaseous discharge devices each having a control grid and a screen grid, a plurality of resistor-capacitor networks each having a time constant different from that of any other network and each associated with a different one of said screen grids, means for connecting the capacitor of said network between its associated screen grid and a first source of reference potential, means for connecting the resistor of said network between its associated screen grid and the selective terminal of a common switching means, one fixed terminal of said switching means being connected to a second source of potential sufficient to bias all of said screen grids to cutoff, and another fixed terminal of said switching means being connected to said first source of reference potential, a plurality of third potential sources each with a potential different from that of any other of said third potential sources and each connected to a different one of said screen grids through a unidirectional current-passing device, said potentials being selected so that their relative magnitudes bear an inverse relation to the time constants of said resistor-capacitor networks associated with said screen grids, an input capacitor connected to all of said control grids, means for applying an input signal of given amplitude to said input capacitor, and means for disconnecting said selective terminal of said switching means from said fixed terminal connected to said second source of potential and applying said selective terminal to said other fixed terminal connected to said first source of reference potential in order to discharge each of said capacitors in said resistor-capacitor networks.

5. A classifying circuit as in claim 4 wherein said unidirectional current-passing devices each comprises a diode connected between the screen grid of said associated gaseous discharge device and said associated third potential source.

6. A classifying circuit as in claim 4 wherein said third potential sources each comprises a potentiometer connected between said second source of potential and said first source of reference potential, the variable tap of each of said potentiometers being connected to the associated unidirectional current-passing device.

References Cited in the file of this patent

UNITED STATES PATENTS

| | | |
|---|---|---|
| 2,541,039 | Cole | Feb. 13, 1951 |
| 2,720,612 | Leonard | Oct. 11, 1955 |
| 2,817,771 | Barnothy | Dec. 24, 1957 |
| 2,821,626 | Freedman | Jan. 28, 1958 |
| 2,863,139 | Michelson | Dec. 2, 1958 |
| 2,869,110 | Wagner | Jan. 13, 1959 |
| 2,987,629 | Germain | Jan. 6, 1961 |